F. A. PUTNAM & L. L. LIVINGSTON.
KNIFE HANDLE.
APPLICATION FILED FEB. 10, 1908.
913,161.
Patented Feb. 23, 1909.
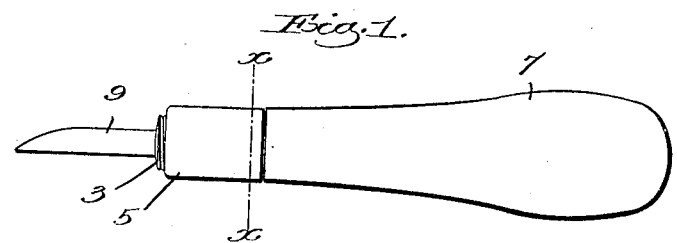
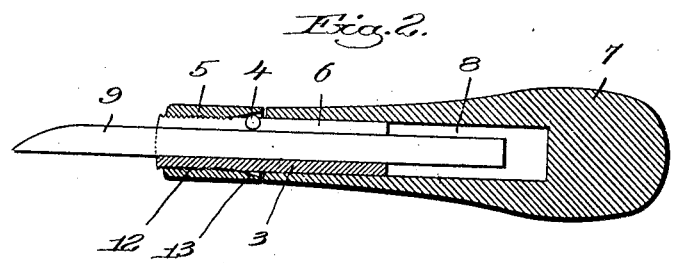
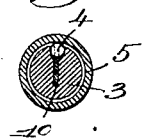
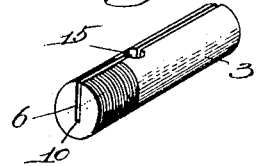

UNITED STATES PATENT OFFICE.

FRED A. PUTNAM, OF MELROSE, AND LLOYD L. LIVINGSTON, OF ABINGTON, MASSACHUSETTS, ASSIGNORS TO SEWING MACHINE SUPPLIES COMPANY, OF BOSTON, MASSACHUSETTS, A CORPORATION OF MASSACHUSETTS.

KNIFE-HANDLE.

No. 913,161.  Specification of Letters Patent.  Patented Feb. 23, 1909.

Application filed February 10, 1908. Serial No. 415,057.

*To all whom it may concern:*

Be it known that we, FRED A. PUTNAM and LLOYD L. LIVINGSTON, citizens of the United States, and residents of Melrose, county of Middlesex, State of Massachusetts, and Abington, county of Plymouth, State of Massachusetts, respectively, have invented an Improvement in Knife-Handles, of which the following description, in connection with the accompanying drawing, is a specification, like numerals on the drawing representing like parts.

This invention relates to handles or holders for knife blades and other tools, and especially to that class of handles wherein the knife blade or other tool is detachable from the handle.

The object of the invention is to provide a novel handle of this type which is simple and inexpensive to manufacture, which is composed of few parts, and which is easily manipulated for clamping the tool in place or unclamping it.

One embodiment of the invention will first be described and then the novel features thereof will be pointed out in the appended claim.

In the drawings, Figure 1 is a side view of the knife handle embodying the invention; Fig. 2 is a longitudinal section thereof; Fig. 3 is a section on the line x—x, Fig. 1; Fig. 4 is a perspective view of the holding member detached from the other parts of the handle.

Our improved handle comprises a holding member 3, a gripping member 4 and a clamping collar 5. The holding member 3 is cylindrical in form and is provided with a tool-receiving slot 6 which extends longitudinally thereof and which is cut into the holding member from one side thereof, but which does not extend clear through the holding member. Said holding member can conveniently be made by cutting a suitable length from a rod and forming the slot 6 in the rod. This holding member is preferably sustained in a handle proper 7 which is preferably made of wood and which is provided with the axial bore 8 into which the end of the holding member may be driven. Where the handle is designed as a knife handle to support a cutting blade 9 as herein shown, the tool-receiving slot 6 will be of a shape to fit the blade, that is, said slot will be of a depth to receive the blade properly and will be of a width substantially equal to the thickness of the blade. It will be obvious, however, that if the tool supported by the handle had a shank of some other form than that herein shown the slot 6 would be appropriately shaped to receive the shank of the tool. When the knife blade or other tool is in the slot, one edge thereof bears against the bottom 10 of the slot and since the slot is of a shape to fit the knife blade or other tool, said knife blade or other tool is maintained in proper position by the slot.

The gripping member 4 serves to firmly clamp the knife blade or other tool in place, and said gripping member is preferably sustained by the holding member in a position to act on the back side of the knife blade or on the side opposite to that which bears on the bottom 10 of the slot. This gripping member may be made in a variety of ways, but we have found that a ball, such as shown in the drawing, answers every purpose and is a convenient form in which to make said gripping member. The invention, however, is not confined to making the gripping member of this particular shape. The gripping member is forced into gripping engagement with the knife blade or other tool by the clamping collar 5 which is screw-threaded to the end of the holding member, as at 12. This clamping collar has the bevel portion 13 which engages the gripping member 4, said gripping member being of a size to extend slightly beyond the periphery of the holding member.

In order to remove the knife blade or other tool it is simply necessary to unscrew the clamping collar 5 sufficiently to withdraw said collar from engagement with the gripping member when the knife blade or other tool can readily be removed from the holding member by withdrawing it longitudinally thereof. In thus removing the knife blade it is not necessary to unscrew the clamping collar sufficiently to withdraw the same entirely from the gripping member and so long as the end of the clamping collar covers the gripping member, the latter cannot fall out from its recess. The recess 15 for the gripping member does not extend deep enough to allow said member to drop down into and across the slot 6 when the knife blade or other tool is completely removed so that said knife blade can always be readily inserted into the groove 6 from the end of the holding member.

After the knife blade or other tool is in position the turning of the clamping collar sufficiently to force the clamping member against the edge of the knife blade results in clamping it firmly against the bottom 10 of the slot and thus locking it securely in position.

Our improved handle comprises three parts which are very simple and inexpensive to manufacture and they result in a handle which is convenient to use and which securely holds the knife blade or other tool.

We have not attempted to illustrate herein all embodiments of our invention, but have been content to describe the preferred embodiment which has been selected for illustrative purposes.

Having fully described our invention, what we claim as new and desire to secure by Letters Patent is:—

A handle comprising a cylindrical holding member provided with a longitudinal tool-receiving slot extending from one end to the other thereof and from one side partially through to the other side and also provided with a recess at the open side of the slot, a ball within said recess, and a clamping collar screw-threaded to the holding member and having an interior cam surface to engage the ball and force the latter against the tool.

In testimony whereof, we have signed our names to this specification, in the presence of two subscribing witnesses.

FRED A. PUTNAM.
LLOYD L. LIVINGSTON.

Witnesses:
  Louis C. Smith,
  Margaret A. Dunn.